United States Patent
Viswanathan et al.

(10) Patent No.: US 10,581,751 B1
(45) Date of Patent: Mar. 3, 2020

(54) MULTI-QUEUE BASED SYSTEM FOR THROTTLING BACKUP AGENT SAVE PROCESSES

(71) Applicant: EMC IP Holding Company LLC, Hopkinton, MA (US)

(72) Inventors: Sathayamoorthy Viswanathan, Chennai (IN); Ajith Gopinath, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 978 days.

(21) Appl. No.: 14/971,935

(22) Filed: Dec. 16, 2015

(51) Int. Cl.
*H04L 12/873* (2013.01)
*H04L 29/08* (2006.01)
*H04L 29/06* (2006.01)

(52) U.S. Cl.
CPC ........ *H04L 47/522* (2013.01); *H04L 67/1095* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2005/0268068 A1* | 12/2005 | Ignatius | G06F 3/0613 711/202 |
| 2009/0193121 A1* | 7/2009 | Shin | G06F 3/061 709/225 |
| 2010/0150164 A1* | 6/2010 | Ma | H04L 12/4625 370/412 |
| 2015/0381505 A1* | 12/2015 | Sundararaman | H04L 47/25 370/235 |

* cited by examiner

*Primary Examiner* — Wynuel S Aquino
*Assistant Examiner* — Melissa A Headly
(74) *Attorney, Agent, or Firm* — Staniford Tomita LLP

(57) ABSTRACT

Embodiments are directed to a method of regulating client agent backup jobs in a backup server by defining a server parallelism value specifying a maximum number of active backup jobs that can be simultaneously performed by the backup server, maintaining a plurality of queues in memory and including an active queue storing active backup jobs comprising a number of current backup jobs not exceeding the server parallelism value, and one or more overflow queues storing backup jobs exceeding the server parallelism value, receiving backup job requests from a plurality of clients and processing the received backup job requests through the plurality of queues, and transmitting a hold command to the plurality of clients if the plurality of queues are full. The overflow queues may comprise a wait queue and a sleep queue.

17 Claims, 4 Drawing Sheets

MULTI-QUEUE BASED SYSTEM FOR THROTTLING BACKUP AGENT SAVE PROCESSES

TECHNICAL FIELD

Embodiments are generally directed to data storage operations, and more specifically to using a multi-queue structure to regulate incoming client save requests in a network backup server.

BACKGROUND

Enterprise-scale backup operations for data protection purposes often involve many backup jobs or workloads from a multitude of client machines. In current data protection scenarios, a backup server generally accepts all backup sessions from data center clients that are configured on the backup server. Server parallelism refers to how many savesets a backup server will simultaneously allow to be active for backups, and backup jobs are usually kept in a backup queue for processing until the server parallelism is exhausted. A server process, such as JOBDB (job database) keeps the track of all the sessions that are active and queued. As current backup sessions are completed, the queued sessions are activated to running sessions and the backup sessions are completed. In a scenario where large numbers of backup clients are configured and more data sets are to be backed up, the overall time spent by the backup session in queued sessions can be very high. In fact, there is often a fair chance that some queued sessions would have to wait forever and time out with an error. For example, sessions may get dropped due to network latency. If any timeout variable is set on the backup server or backup client agent then all queued up sessions will be aborted and backups of those clients will fail. There are situations where the backup server is exhausted due to overload from an excessively large number of queued sessions. The inability to handle these multiple processes leads to backup failure and vulnerability of client data.

In current backup systems, there is no intelligence between the backup server and the backup clients to regulate (or "throttle") the incoming save processes based on the current backup server load. For example, some enterprise backup applications specify a maximum server parallelism limit (e.g., 1024 parallel backup sessions), and if the server receives more than this maximum number, it will put sessions in the queue and if the current backup sessions are taking more time than the timeout value to complete, then the queued backup sessions will get aborted. In a scenario where features like parallel savestreams are enabled, one save set itself may spawn multiple save sessions which would eventually exhaust the server parallelism if too many backup clients are so configured. Thus, for large-scale backup scenarios current backup servers may be overwhelmed thus causing backup jobs to be suspended or aborted.

What is needed, therefore, is a system and method improves the performance of large-scale backup operations by regulating backup sessions to prevent aborting backup jobs due to excessive scheduling.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
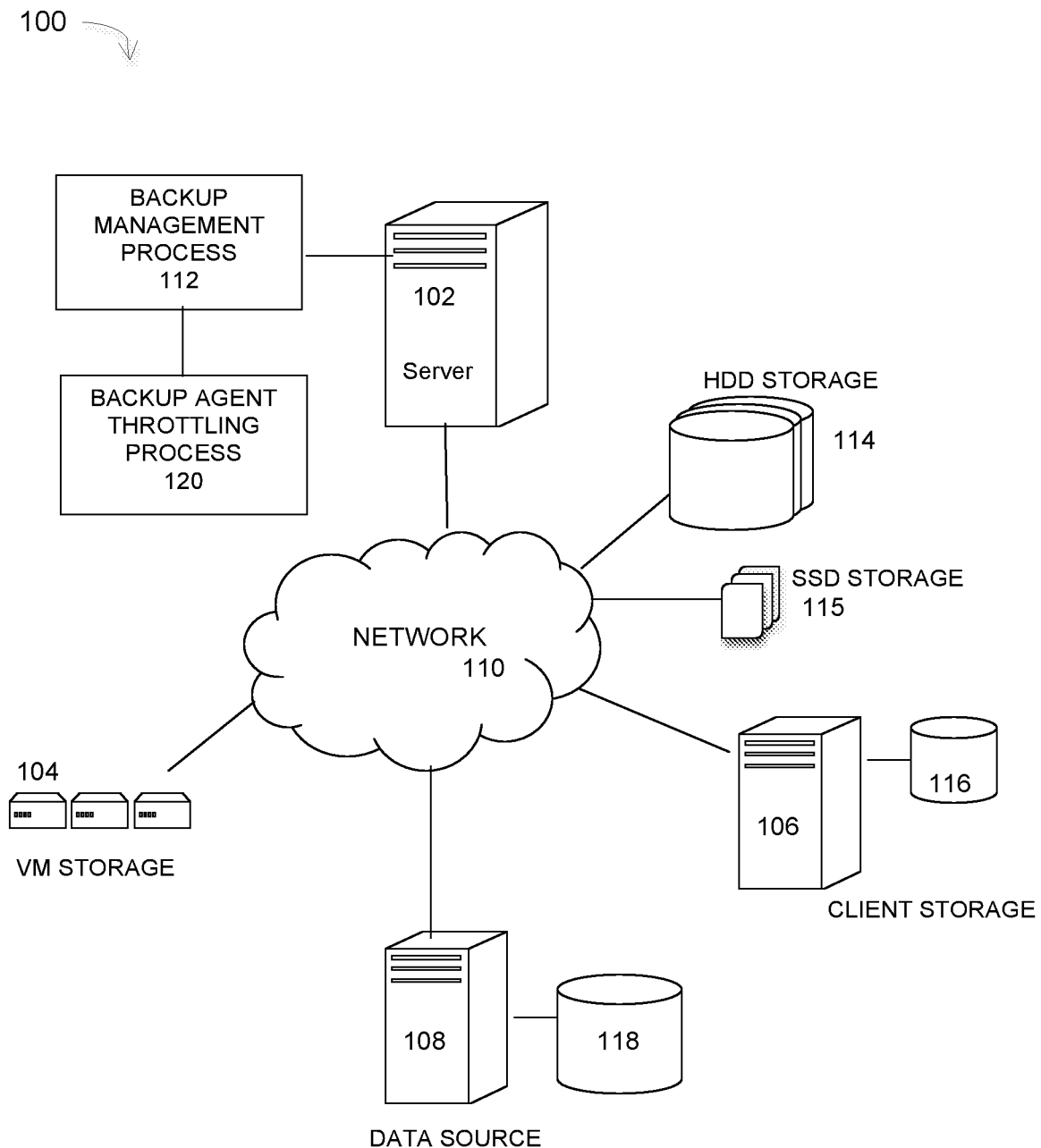
FIG. 1 illustrates a data storage system that implements one or more embodiments of a backup agent regulating process for data protection operations, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a processing component in or associated with a backup server or memory controller that uses a queue management process to regulate or throttle backup agent save processes. FIG. 1 illustrates a computer network system 100 that implements one or more embodiments of a large-scale network implementing a backup agent throttle process, under some embodiments. In system 100, a backup server 102 executes a backup management process 112 that coordinates or manages the backup of data from one or more data sources 108 to storage devices, such as HDD 114 or SSD 115 network storage, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) having many VMs each. The network storage devices serve as target storage devices for data backed up from one or more data sources, such as computer 108, which may have attached local storage 118 or utilize networked accessed storage devices 114, 115. Data source 108 represents one of many possible backup agents that initiate save sessions to backup their data to storage devices on the network 100 through the backup server 102 and backup management process 112. The data may be locally sourced or remotely sourced, and the client 108 may initiate save or backup sessions on an automatically scheduled basis or a manually initiated basis. In a data protection scenario, client 108 usually initiates data backups on a regular periodic schedule, such as hourly, daily, weekly, and so on. The backups may be full, incremental, differential, or any other appropriate backup type, depending on application needs and system configuration.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) that uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the network storage devices 114, 115, client storage 116, data sources 108, and VMs 104 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, 115 which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage devices. For the embodiment of FIG. 1, the network storage devices comprise both individual or arrays of hard disks (HDD) 114 or solid-state drives (SSD) 115. The SSD devices 115 may be embodied as flash drives or any other similar solid-state memory device.

For the embodiment of FIG. 1, network system 100 includes a server 102 that executes a data backup process with a functional component 120 that provides a regulation process for throttling backup/save requests from client computers and processes to the backup server. The backup management process 112 automates the backup of network data using the target storage devices. In an embodiment, the process 112 uses certain known full and incremental backup techniques along with a process or system component 120 to back up data in an efficient manner with respect to the overhead associated with updating and storing the metadata.

In an embodiment, system 100 may represent a Data Domain Restorer (DDR)-based de-duplication storage system, and storage server 128 may be implemented as a DDR De-duplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the de-duplication process to the backup server or application clients, enabling client-side de-duplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism.

As stated above, in current data backup systems, the backup server accepts all backup sessions from clients and keeps backup jobs or sessions in a queue for processing until the server parallelism is exhausted, thus leading to a situation where queued sessions may need to be aborted if excessive jobs are initiated. This situation is exacerbated when parallel backup is running. As shown in FIG. 1, the backup system includes a backup session throttling process that regulates the client backup agent save processes based on the actual server load. This helps to avoid overloading server processes without compromising the client's quality of service (QoS).

Figure 2:
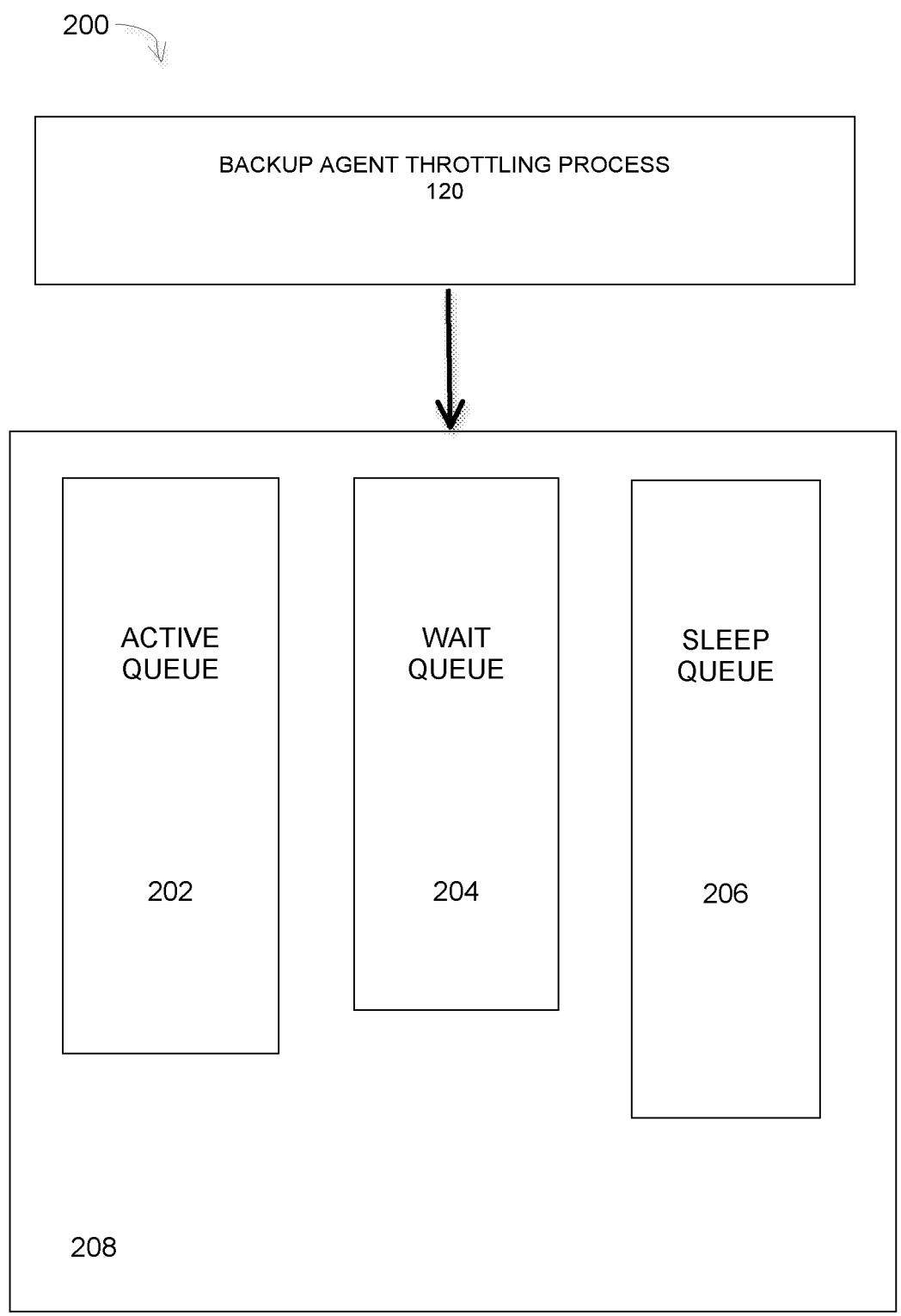
FIG. 2 illustrates the backup queues maintained by the backup agent throttling process 120 and used by the backup management process 112, under an embodiment.

In an embodiment the backup management process 112 uses three different queues to store pending backup jobs initiated by client (e.g., 108) backup agents. In this way, job processes are built with an intelligent mechanism to throttle the backup agent's save process which is achieved by the three different types of queues, priority checking and pooling mechanisms. FIG. 2 illustrates the backup queues maintained by the backup agent throttling process 120 and used by the backup management process 112, under an embodiment. As shown in diagram 200, the first queue is the active queue 202 (QUEUE_ACTIVE), which tracks the current active backup sessions from the backup server 102 and which has a queue size that is equivalent to the maximum server parallelism value (e.g., 1024 sessions). The second queue is the wait queue 204 (QUEUE_WAIT), which tracks the number of session that is waiting to get the active session from the backup server. This queue size is always less than or equal to the active queue. The third queue is the sleep queue 206 (QUEUE_SLEEP), which tracks the incoming session to the backup server when the server is fully loaded and not able to take another session. This queue size is greater than or equal to the server parallelism value. The wait and sleep queues may represent and be referred to as "overflow" queues since they hold backup jobs that exceed the storage capacity of the active queue and cannot be stored by the active queue based on the maximum server parallelism value.

In an embodiment, the three queues are managed or maintained by the backup agent throttling process 120 and maintained in a memory location 208. The size and configuration of the queues may be defined by the backup management process and may store backup job or session data in any appropriate format. In an embodiment, the queues may be embodied as buffers stored in volatile or non-volatile memory and may be structured according to any appropriate data structure format.

Although embodiments are described for a plurality of queues comprising three queues, it should be noted that any practical number of active and overflow queues may be used, and the length (storage capacity) and configuration of these queues may be changed depending on system constraints and requirements.

The backup management process 112 maintains a JOBDB process, which manages a database of current sessions being queued. The backup agent throttling process 120 monitors the sessions, schedules the backups and polls the queues. When a scheduled backup job is initiated from the backup server, backup client talks to the JOBDB daemon process in the backup server to determine whether the backup server can process the save request from the clients. If the JOBDB daemon tells the client that the server is fully engaged then new save sessions from the clients will queued into the sleep queue 206. In some scenarios, the JOBDB daemon tells the client that the sleep queue is also full. In this case, the client should not send anymore save sessions to the server. The client holds the jobs and polls the backup server's JOBDB daemon process at particular intervals (e.g., every 60 seconds) to check if the sleep queue is free to send more sessions. An infinite wait period for the sessions can be avoided by implementation a timeout period so that the sessions do not wait forever. At the same time client backup priority is also considered based on the SLA. If a client backup policy is configured with higher priority, the server processes the save request from the particular client rather than for a client with lesser priority value set.

Queue processing using the three queues reduces the overhead of the server process as well as the JOBDB process. All currently running processes are placed in the active queue as long as the numbers of incoming sessions are less than the maximum server parallelism value. The JOBDB process keeps track of the incoming sessions and will keep them in the wait queue if the current active sessions are more than the server parallelism value. The wait queue acts as a buffer between the active queue and the sleep queue. When the active queue frees some sessions, the wait queue sessions are moved to the active queue and the sleep queue receives sessions from those clients that are polling from the client side.

Figure 3:
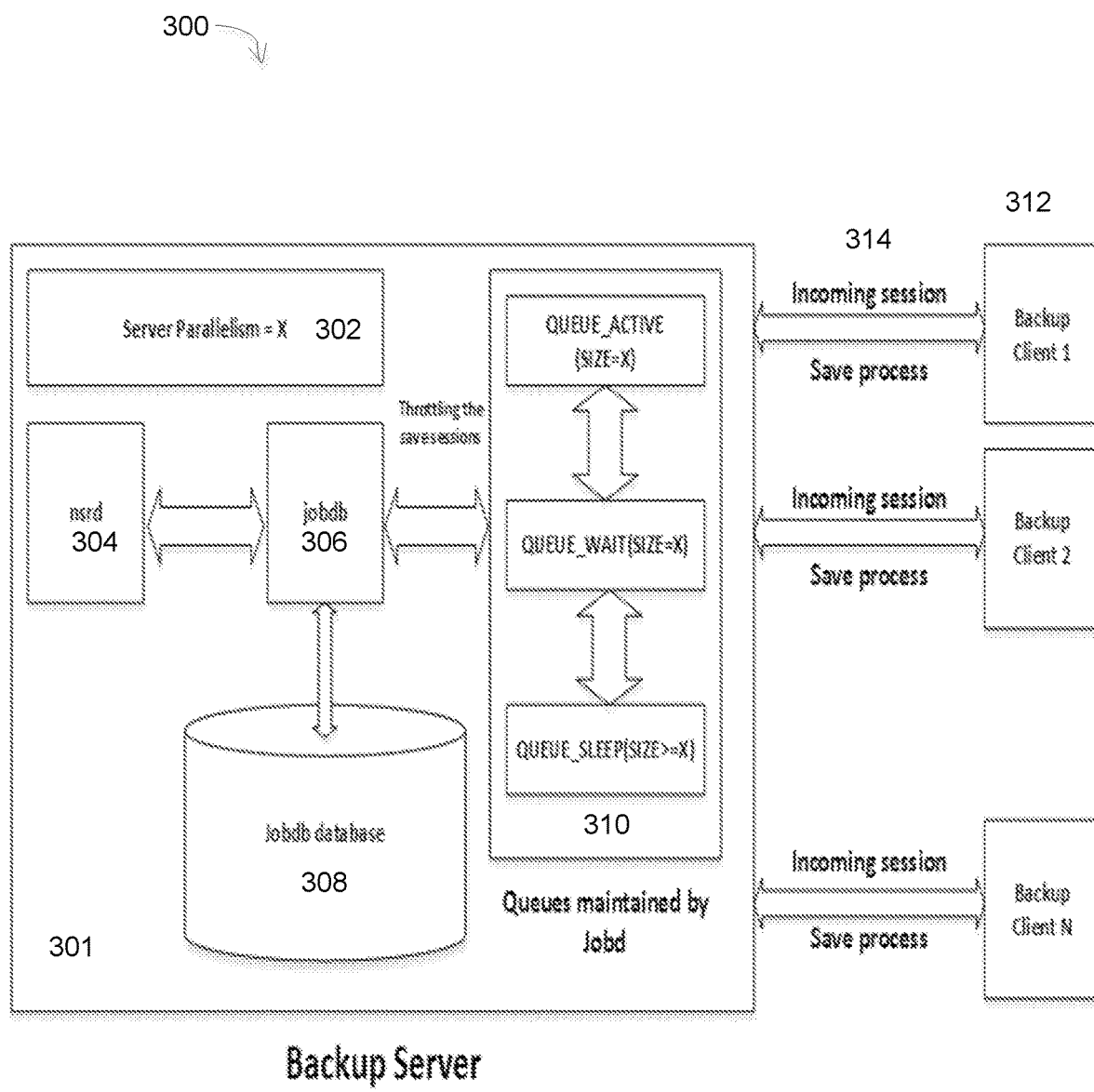
FIG. 3 is a block diagram illustrating queue-based throttling of client backup sessions in the backup server, under some embodiments.

FIG. 3 is a block diagram illustrating queue-based throttling of backup sessions in the backup server, under some embodiments. As shown in diagram 300, process component 301 which may at least in part correspond to throttling process 120 in FIG. 1, includes a JOBDB database 308 and process 306 that is controlled by nsrd process 304, which is the master process within backup server 102 for managing client backup sessions. As shown in FIG. 3, a number of backup clients 312 (e.g., shown as backup clients 1 to N) initiate backup sessions for save processes 314 through appropriate backup commands. Component 302 includes or is programmed with several parameters including the server parallelism value 302. It also maintains the three queues 310 labeled for the example illustration as QUEUE_ACTIVE, QUEUE_WAIT, and QUEUE_SLEEP. The queues can be configured based on the requirements and constraints of the system, but in general, the following rules are applied: (1) the length of QUEUE_ACTIVE will be equivalent to the server parallelism value; (2) the length of QUEUE_WAIT will be less than or equal to QUEUE_ACTIVE; (3) the length of QUEUE_SLEEP will be defined with fixed size value based on the historical data, but should be greater than or equal to the server parallelism value.

With regard to the throttling process, when a scheduled backup is triggered from the backup server, the client's backup process daemon will contact the JOBDB daemon process 306 in the backup server. The backup will proceed only when the JOBDB daemon processes a node to the backup process. The JOBDB daemon will maintain the status of the server's current load. If the server is fully engaged, the client sessions will be queued in the QUEUE_SLEEP queue. If QUEUE_SLEEP is also full, then client backup agent will hold the session, which helps to prevent the job suspension and network traffic congestion. These processes will be notified when the backup server is load free and open to take more sessions. For this, the client backup agent polls the JOBDB process to check if the QUEUE_SLEEP is free to queue more sessions. The JOBDB process includes intelligence to honor client Quality of Service (QOS) and the backup policy SLA (service level agreement) requirements, if such parameters are made available and programmed into the process. If QUEUE_ACTIVE is freeing some session then queued sessions will be moved in an upward direction from the sleep queue to the wait queue and then to the active queue, and QUEUE_SLEEP will tell the polling clients to send in more sessions, which were on hold.

Priority of save sessions can also be considered in processing by the throttling process. For example, if a client is configured with higher priority than another client, the JOBDB daemon will factor this into consideration when it processes the save sessions from different clients.

Figure 4:
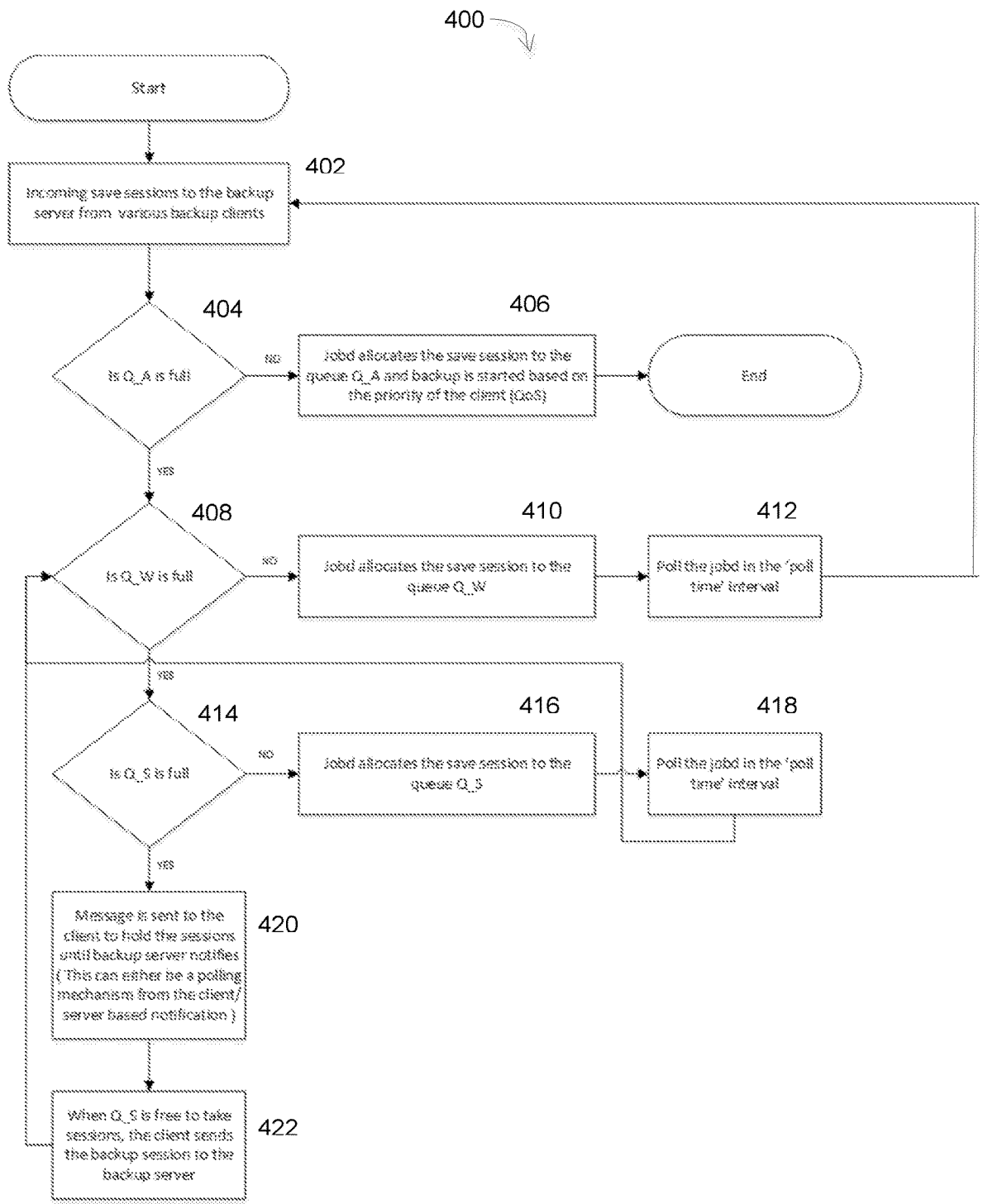
FIG. 4 is a flowchart illustrating a process of throttling client backup sessions, under some embodiments.

FIG. 4 is a flowchart illustrating a process of throttling client backup sessions, under some embodiments. The process of FIG. 4 begins with incoming save sessions being sent to the backup server from various (e.g., 1 to N) backup clients, block 402. The process first checks whether the active queue (QUEUE_ACTIVE or Q_A) is full, decision block 404. If not the JOBDB daemon process allocates the save session to the active queue and the backup is started based on the priority of the client, based on QoS or other parameters, block 406, and the process ends.

If, however, the active queue is full as determined in block 404, the process then checks if the wait queue (QUEUE_WAIT or Q_W) is full, decision block 408. If it is not full the JOBDB daemon process allocates the save session to the wait queue, block 410. The JOBDB process is then polled per a poll time schedule by the backup client so that the session can be moved to the active queue when the active queue is no longer full, block 412, and the process iterates from block 402.

If, however, the wait queue is full as determined in block 408, the process then checks if the sleep queue (QUEUE_SLEEP or Q_S) is full, decision block 414. If it is not full the JOBDB daemon process allocates the save session to the sleep queue, block 416. The JOBDB process is then polled per a poll time schedule by the backup client so that the session can be moved to the wait queue when the wait queue is no longer full, block 418, and the process iterates from block 408.

If, however, the sleep queue is full as determined in block 414, the process sends a message to the client telling the client to hold the save sessions until the backup server notifies that the sleep queue is no longer full, block 420. This notification can be performed by either a client polling of the server, or a server notification from the server to the client. When the sleep queue is not full and therefore free to take sessions, the client sends the backup session to the backup server, block 422. The process 400 then serves to push the queued sessions up to the wait and active queues from the save queues, based on the priority of the queued backup sessions.

The use of multiple queues (e.g., three queues) as described and illustrated above serves to regulate or throttle the client backup agent's process, which reduces the network bandwidth congestion such as when the backup server is busy and cannot accommodate any more sessions. This throttling process is intelligently notified to the client process so that the client does not have to send the save session and wait indefinitely at the server side. This helps to improve the server performance as the queue mechanism offloads the session tracking workload from the JOBDB daemon process. Moreover, the backup success ratio will increase as the client sessions will not be dropped unnecessarily.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of regulating backup jobs initiated for backup clients, in a backup server, comprising:
    defining a server parallelism value specifying a maximum number of active backup jobs that can be simultaneously performed by the backup server;
    maintaining a plurality of queues in memory and including an active queue storing active backup jobs comprising a number of current backup jobs less than or equal to the server parallelism value, a wait queue storing backup jobs in excess of the active queue capacity and having a storage length less than or equal to the length of the active queue, and a sleep queue storing backup jobs in excess of the wait queue capacity and having a storage length having a fixed size based on the historical storage requirements and greater than or equal to the server parallelism value, wherein the wait queue and sleep queue each comprise overflow queues in which the wait queue stores queued backup jobs if the active queue is full and the sleep queue stores excess queued backup jobs if the wait queue is full;

maintaining, in a job process of the backup server, a database of the backup jobs;

upon initiating a scheduled backup job, receiving from a backup client to the job process an inquiry as to whether the backup server can process a save request from the backup client; and sending a response to the backup client comprising a status of the queues to cause the backup client to await the queues or not send further backup jobs by transmitting a hold command to the backup client if each of the plurality of queues is full in the order of the active queue first, followed by the wait queue, and then the sleep queue, to thereby provide intelligent coordination between the backup server and backup clients.

2. The method of claim 1 further comprising determining a service level agreement (SLA) requirement for the scheduled backup job to determine a priority of the scheduled backup job relative to other backup jobs from other backup clients.

3. The method of claim 2 wherein excessive backup jobs for the active queue are sent to be stored in the wait queue, and excessive backup jobs for the wait queue are sent to be stored in the sleep queue.

4. The method of claim 3 wherein the hold command is transmitted when the sleep queue is full after both the active and wait queues are full.

5. The method of claim 4 wherein the hold command is transmitted until at least one of the queues is empty.

6. The method of claim 5 wherein the hold command is suspended by one of a notification by the backup server that backup sessions can be received by the backup server.

7. The method of claim 6 wherein the notification comprises one of a server notification sent by the backup server to the plurality of clients, and a polling notification received by the plurality of clients polling the backup server.

8. The method of claim 1 wherein the plurality of queues are stored in buffer memory and maintained by a master backup server daemon process that accesses the backup job database, and wherein the backup client communicates directly with the daemon process.

9. A system regulating client agent backup jobs in a backup server, comprising:
a memory storing a server parallelism value specifying a maximum number of active backup jobs that can be simultaneously performed by the backup server;
a buffer in the memory storing a plurality of queues and including an active queue storing active backup jobs comprising a number of current backup jobs less than or equal to the server parallelism value, and one or more overflow queues storing backup jobs exceeding the server parallelism value, and including an active queue storing active backup jobs comprising a number of current backup jobs less than or equal to the server parallelism value, a wait queue storing backup jobs in excess of the active queue capacity and having a storage length less than or equal to the length of the active queue, and a sleep queue storing backup jobs in excess of the wait queue capacity and having a storage length having a fixed size based on the historical storage requirements and greater than or equal to the server parallelism value, wherein the wait queue and sleep queue each comprise overflow queues in which the wait queue stores queued backup jobs if the active queue is full and the sleep queue stores excess queued backup jobs if the wait queue is full;
an interface receiving backup job requests from a plurality of clients; and a backup server component maintaining, in a job process of the backup server, a database of the backup jobs, and upon initiating a scheduled backup job, receiving from a backup client to the job process an inquiry as to whether the backup server can process a save request from the backup client, and sending a response to the backup client comprising a status of the queues to cause the backup client to await the queues or not send further backup jobs by transmitting a hold command to the backup client if the each of the plurality of queues is full in the order of the active queue first, followed by the wait queue, and then the sleep queue, to thereby provide intelligent coordination between the backup server and backup clients.

10. The system of claim 9 wherein the backup server component further determines a service level agreement (SLA) requirement for the scheduled backup job to determine a priority of the scheduled backup job relative to other backup jobs from other backup clients.

11. The system of claim 10 wherein the hold command is transmitted when the sleep queue is full after both the active and wait queues are full.

12. The system of claim 11 wherein the hold command is transmitted until at least one of the queues is empty.

13. The system of claim 12 wherein the hold command is suspended by one of a notification by the backup server that backup sessions can be received by the backup server.

14. The system of claim 13 wherein the notification comprises one of a server notification sent by the backup server to the plurality of clients, and a polling notification received by the plurality of clients polling the backup server.

15. The system of claim 10 further comprising a backup job database functionally coupled to the plurality of queues and a master backup server daemon process manages received backup job requests from the plurality of clients, and wherein the backup client communicates directly with the daemon process.

16. A computer program product, comprising a non-transitory computer-readable medium having a computer-readable program code embodied therein, the computer-readable program code adapted to be executed by one or more processors to regulate client agent backup jobs in a backup server, by:
defining a server parallelism value specifying a maximum number of active backup jobs that can be simultaneously performed by the backup server;
maintaining a plurality of queues in memory and including an active queue storing active backup jobs comprising a number of current backup jobs less than or equal to the server parallelism value, a wait queue storing backup jobs in excess of the active queue capacity and having a storage length less than or equal to the length of the active queue, and a sleep queue storing backup jobs in excess of the wait queue capacity and having a storage length having a fixed size based on the historical storage requirements and greater than or equal to the server parallelism value, wherein the wait queue and sleep queue each comprise overflow queues in which the wait queue stores queued backup jobs if the active queue is full and the sleep queue stores excess queued backup jobs if the wait queue is full;
maintaining, in a job process of the backup server, a database of the backup jobs;
upon initiating a scheduled backup job, receiving from a backup client to the job process an inquiry as to whether the backup server can process a save request from the backup client; and sending a response to the backup client comprising a status of the queues to cause the backup client to await the queues or not send further backup jobs by transmitting a hold command to the backup client if each of the plurality of queues is full in the order of the active queue first, followed by the wait queue, and then the sleep queue, to thereby provide intelligent coordination between the backup server and backup clients.

17. The computer program product of claim 16, wherein the program code is further adapted to determine a service level agreement (SLA) requirement for the scheduled backup job to determine a priority of the scheduled backup job relative to other backup jobs from other backup clients.

\* \* \* \* \*